(12) United States Patent
Danz

(10) Patent No.: US 8,784,610 B1
(45) Date of Patent: Jul. 22, 2014

(54) METHOD FOR MAKING PAPER FROM POST-INDUSTRIAL PACKAGING MATERIAL

(75) Inventor: Thomas A. Danz, Neenah, WI (US)

(73) Assignee: George A. Whiting Paper Company, Menasha, WI (US)

( * ) Notice: Subject to any disclaimer, the term of this patent is extended or adjusted under 35 U.S.C. 154(b) by 0 days.

(21) Appl. No.: 13/337,861

(22) Filed: Dec. 27, 2011

Related U.S. Application Data

(60) Provisional application No. 61/427,359, filed on Dec. 27, 2010.

(51) Int. Cl.
*D21H 11/14* (2006.01)
*D21H 11/12* (2006.01)
*D21H 27/00* (2006.01)
*D21H 27/10* (2006.01)

(52) U.S. Cl.
CPC ............. *D21H 11/14* (2013.01); *D21H 11/12* (2013.01); *D21H 27/00* (2013.01); *D21H 27/10* (2013.01)
USPC .............. 162/147; 162/98; 162/149; 162/189

(58) Field of Classification Search
CPC ....... D21H 11/12; D21H 11/11; D21H 11/14; D21H 27/00; D21H 27/10
USPC ................ 162/91, 98–99, 141, 147–149, 189
See application file for complete search history.

(56) References Cited

U.S. PATENT DOCUMENTS

| | | | |
|---|---|---|---|
| 57,192 A | 8/1866 | Russell | |
| 4,363,699 A | 12/1982 | DeCeuster et al. | |
| 5,935,880 A | 8/1999 | Wang et al. | |
| 6,086,998 A | 7/2000 | Wihsmann et al. | |
| 6,187,136 B1 | 2/2001 | Pedersen et al. | |
| 6,302,997 B1 * | 10/2001 | Hurter et al. | 162/65 |
| 6,348,127 B1 | 2/2002 | Gallagher et al. | |
| 6,378,179 B1 * | 4/2002 | Hirsch | 28/103 |
| 6,620,459 B2 | 9/2003 | Colvin et al. | |
| 6,762,138 B2 | 7/2004 | Ferreira et al. | |
| 6,784,126 B2 * | 8/2004 | Everhart et al. | 442/401 |
| 6,811,879 B2 | 11/2004 | Dezutter et al. | |
| 7,241,711 B2 | 7/2007 | Takai et al. | |
| 7,250,382 B2 | 7/2007 | Takai et al. | |
| 7,306,846 B2 | 12/2007 | Dezutter et al. | |
| 7,585,390 B2 | 9/2009 | Nunn et al. | |
| 7,754,050 B2 | 7/2010 | Redd et al. | |
| 8,092,648 B2 * | 1/2012 | Nunn et al. | 162/146 |
| 2002/0132548 A1 * | 9/2002 | Ferreira et al. | 442/408 |
| 2006/0191655 A1 * | 8/2006 | Nunn et al. | 162/147 |
| 2008/0289783 A1 | 11/2008 | Luo et al. | |
| 2010/0310893 A1 * | 12/2010 | Derbyshire et al. | 428/528 |

* cited by examiner

*Primary Examiner* — Jose Fortuna
(74) *Attorney, Agent, or Firm* — Boyle Fredrickson, S.C.

(57) ABSTRACT

A method is provided for making paper and paper products from post-industrial packaging materials. The post-industrial packaging materials may include used bulk packaging transportation bags that are made at least partially from sisal and/or jute, such as coffee bean bags or used cocoa bean bags for transporting bulk quantities of coffee beans or cocoa beans, or other materials that have sisal and/or jute constituents. The post-industrial packaging materials may be used to make a mixed fiber stock that includes the post-industrial packaging materials and the post consumer fiber stock and/or other wood-based fiber stock that is a combined with the post-industrial packaging stock prior to the mixed fiber stock being run through a paper machine to make paper and paper products that may be used back in the industry that created the waste.

18 Claims, 3 Drawing Sheets

METHOD FOR MAKING PAPER FROM POST-INDUSTRIAL PACKAGING MATERIAL

CROSS REFERENCE TO RELATED APPLICATIONS

This application claims priority from U.S. Provisional Patent Application Ser. No. 61/427,359, filed on Dec. 27, 2010, the entirety of which is expressly incorporated by reference herein.

BACKGROUND OF THE INVENTION

1. Field of the Invention

The present invention relates to paper making and, more specifically, to making paper from previously used materials.

2. Discussion of the Related Art

Making paper from previously used materials is known in the paper-making industries. Such paper and products made from it has been called eco-friendly because reusing materials in this way may contribute to, e.g., waste reduction and resource conservation.

It is also known that some materials are particularly well suited for being reused in paper making after their initial use. For example, previously used paper products that are made from primarily woody fibers are readily reusable for making subsequent paper products. That is because such materials having primarily woody fibers can be repulped and may be processed in ways that are at least somewhat similar to raw wood pulping procedures.

SUMMARY OF THE INVENTION

The inventor has recognized that some post-industrial packaging materials have been viewed as wholly unusable as being recyclable materials due to inherent poor workability characteristics of these materials. The inventor has also recognized that within at least some industries, such post-industrial packaging materials are readily available and that certain efficiencies may be appreciated by collecting these post-industrial packaging materials within their own commercial supply chain. The inventor has further recognized that such collecting efficiencies and the high availability of these post-industrial packaging materials may outweigh the troubles associated with the poor workability characteristics, especially if they are recycled for use within the same industry in a manner that may lead to yet further efficiencies because common supply chain elements are being used.

The inventor has recognized that various industries such as the coffee related industries and the chocolate related industries have readily available post-industrial packaging materials that have been viewed as wholly unusable for papermaking as being recyclable materials due to their inherent poor workability characteristics. The inventor has recognized that so-called burlap-type coffee bean bags and/or cocoa bean bags for transporting bulk quantities of coffee and/or cocoa beans and which are made from, e.g., sisal and/or jute, tend to be single-use items and are difficult to dispose of properly. The inventor has recognized that used coffee and/or cocoa bean bags have relatively long fibers that present numerous processing difficulties and, once reduced to individual fibers are exceedingly dusty. The inventor has developed methods of controlling dusting while working with used coffee and/or cocoa bean bag materials and methods of making paper and paper products from used coffee and/or cocoa bean bag materials. The paper products may be used within the same industry, for example, further downstream but within the same supply chain as retail-related paper products.

In accordance with an aspect of the invention, at least one of these desires is fulfilled by providing a method of producing paper from post-industrial packaging material (PIP) such bags or other used packaging material and performing at least one or more of the following steps: (i) pre-wetting of bales of PIP material to be pulped, (ii) recirculating PIP containing stock between a surge chest and a refiner to increase refining time and thus increase a level of refining of a PIP containing stock before a run begins on a paper machine, (iii) directing PIP containing stock through a pressure screen with the pressure screen's basket removed and the pressure screen being ahead of a refiner, and (iv) bypassing a Selectifier pressure screen to deliver PIP containing stock out of a fan pump, through primary cleaners, around but not through the Selectifier, and to a head box at a wet end of a paper machine.

In accordance with another aspect of the invention, PIP provides long fibers that are refined in the mill by recirculating PIP containing stock between various mill components. Fibers that are relatively short and more refined, for example, various wood-based fibers such as post consumer fiber (PCF) or other wood based fibers (WBF), are blended into the PIP containing stock to make a mixed fiber stock. Fibers of PCF tend to be much shorter and highly refined when compared to fibers of PIP.

In accordance with another aspect of the invention, the PIP includes sisal and/or jute and is preferably used coffee and/or cocoa bean bags. The PIP may be used to make a mixed fiber stock that is run through a paper machine. The mixed fiber stock may be made by processing PIP containing stock and incrementally blending of PCF/WBF (meaning PCF and/or WBF) into the PIP containing stock. The PIP containing stock that is initially processed may include some PCF/WBF material and then additional PCF/WBF material may be incrementally added to the PIP containing stock until a desired ratio of PIP to PCF/WBF has been achieved for use as the mixed fiber stock to run through the paper machine. In other words, a batch of PIP may initially be processed in a pulper along with some PCF/WBF to make a PIP containing stock. The PIP containing stock may be sent downstream of the pulper in the mill and then the pulper may process a batch of PCF/WBF. The batch of PCF/WBF stock may be later combined with the PIP containing stock to create the mixed fiber stock that is sent to the paper machine.

In accordance with another aspect of the invention, a first material that includes PIP is pulped to make a volume of PIP containing stock. The PIP containing stock is recirculated between a surge chest and a refiner so as to increase a refining level of the PIP containing stock. A second material that includes post consumer fiber (PCF) or other wood based fiber (WBF) is pulped to make a volume of PCF/WBF stock. The PIP containing stock and PCF/WBF stock are combined to make a volume of mixed fiber stock. The mixed fiber stock is run through a paper machine to produce paper.

According to other aspects of the invention, the PIP containing stock includes at least one and, optionally, both of sisal fibers and jute fibers. The sisal and jute may be provided in unequal amounts with respect to each other. Such unequal amounts may be varied to change the physical characteristics and appearance of the end product.

According to another aspect of the invention, used coffee bean bags provide the sisal and jute fibers for the PIP containing stock. The PIP containing stock may further include some PCF/WBF. Within the PIP containing stock, the volume of PIP is preferably greater than the volume of PCF/WBF, optionally the volume of PIP may be about equal to the volume of PCF/WBF. Within the overall mixed fiber stock from which paper is made, the volume of PIP containing stock may be greater than, equal to, or less than the volume of PCF/WBF stock.

According to another aspect of the invention, the method includes a step of making a paper product from the paper produced with PIP material. The paper product may be at least one of (i) point of sale products, (ii) counter cards, (iii) signage, (iv) card carriers, (v) product tags, (vi) retail products, and (vii) retail packaging. Examples of suitable point-of-sale products include placemats, table runners, shrouds for table top cubes, frames mounted to kraft corrugate to house 4-color printed graphics, shelf liners, frame corner decorations, lug-ons for menus or other signage, and tabletop accordion fold frames. Examples of product tags include hang tags, band wraps, belly bands, and gift tags. Examples of retail products include notepads, recipe cards, stationary products, apparel, calendars, coasters, and greeting cards. Examples of retail packaging include coffee cup sleeves, retail bags such as handle bags for toting merchandise, box facing, and gift boxes.

According to yet another aspect of the invention, dusting is controlled while producing paper from post-industrial packaging material. This may be accomplished by providing a bale of PIP to be pulped into a volume of PIP containing stock that is usable for making paper and then wetting the bale of PIP. The wetted bale of PIP is loaded into a pulper and pulped into a stock that is used to make the paper. The wetting may be achieved by spraying the bale of PIP with water.

According to another aspect of the invention, dusting may be further controlled by facing the bale, in other words wrapping the outside of the bale, with a pulp sheet made with at least one of (i) a softwood fiber which may be a virgin fiber, and (ii) a post consumer fiber. The pulp sheet that faces the bale is loaded into the pulper and pulped with the bale so that the pulp sheet is incorporated into the stock from which the paper is made. A wire that holds the pulp sheet against the bale may be released while the bale is being held above an opening of the pulper through which the bale is loaded into the pulper. This may help control dusting by arranging the pulp sheet with respect to the bale so that it substantially encapsulates the bale, whereby dust is contained inside of a barrier defined by the pulp sheet.

According to another aspect of the invention, paper is produced by pulping a material that includes PIP to make a volume of PIP containing stock and pumping the PIP containing stock from a surge chest to a refiner without directing the PIP containing stock through a basket of a pressure screen, while pumping the PIP containing stock from the surge chest to the refiner. The PIP containing stock may be directed through a pressure screen with its basket removed while pumping the PIP containing stock from the surge chest to the refiner.

According to another aspect of the invention, the PIP containing stock is directed through a primary cleaner and to a headbox of a paper machine while bypassing a Selectifier pressure screen that is provided between the primary cleaner and the headbox. The Selectifier may be bypassed by closing valves into a screen of the selectifier and installing a spool piece of pipe that is routed around the screen of the selectifier and connects to the headbox.

According to yet another aspect of the invention, previously used product(s) from a particular industry is collected as used as donor PIP material for use in making paper that can be used to make subsequent product(s). The PIP material is pulped to make a volume of PIP containing stock. Paper is made from the PIP containing stock and then product(s) is made from the paper. The product(s) is used in the same industry in which the PIP was used, which may enhance the environmental sustainability of the industry. The previously used product that is used as a source of PIP material can be different from the subsequently made product that incorporates the PIP material. The new product may be a retail product, whereas the PIP may have been used as transportation packaging.

According to another aspect of the invention, the industry may be a coffee or chocolate related industry. The PIP may include coffee and/or cocoa bean bags made from sisal and/or jute and being configured for bulk transportation of coffee and/or cocoa beans to a coffee roaster or chocolate retailer.

According to yet another aspect of the invention, the coloring of the paper being made is controlled by the stock constituents. A material that includes at least some sisal is loaded into a pulper. The amount of sisal relative to at least one other component of the material being loaded into the pulper is controlled and the material is pulped to produce a mixed fiber stock. The mixed fiber stock is run through a paper machine to produce paper having a color characteristic that corresponds to the amount of sisal that was in the material used for making the mixed fiber stock relative to the at least one other component of the material used for making the mixed fiber stock. Relatively more sisal may be added to provide a relatively lighter colored paper while mitigating a bleaching requirement or reducing the amount of bleach needed while making the paper.

Other features and advantages of the invention will become apparent to those skilled in the art upon review of the following detailed description, claims, and drawings in which like numerals are used to designate like features.

BRIEF DESCRIPTION OF THE DRAWINGS

The drawings illustrate the best mode currently contemplated of practicing the present invention.

In the drawings.

Figure 1:
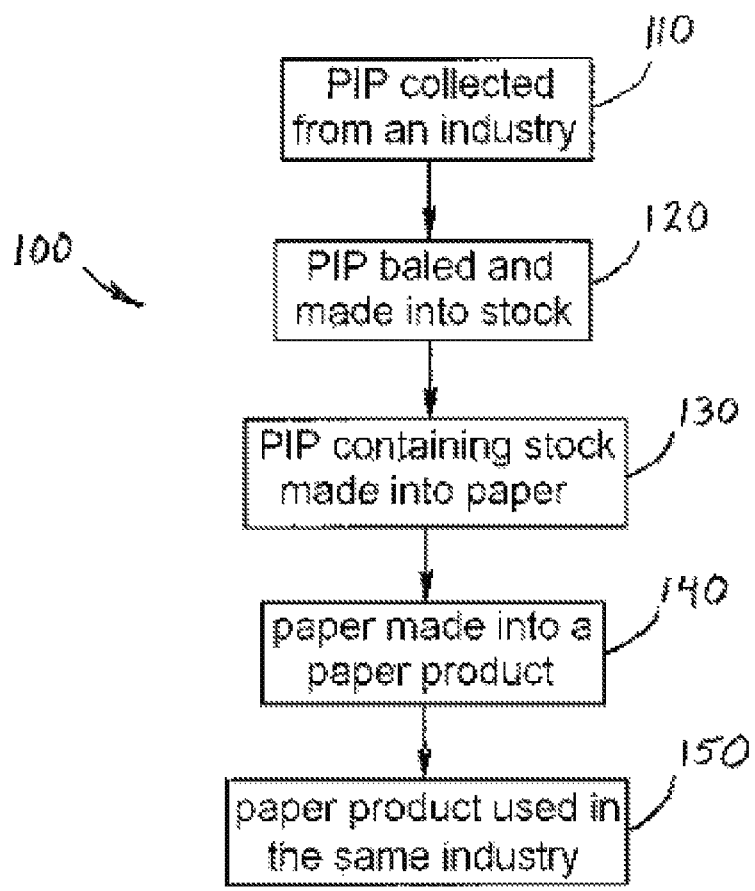
FIG. 1 is a flowchart illustrating a method of recycling post-industrial packaging material according to the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

The preferred embodiments are directed to utilizing used coffee bean bags, cocoa bean bags, or other sisal or jute containing products, as a post-industrial packaging (PIP) source of sisal and/or jute that is used for making paper and paper products. FIG. 1 shows, in flowchart format, an overview of a method 100 of recycling PIP material according to the present invention into paper and paper products. Initially, in block 110, PIP is collected that was used in a particular industry. In block 120, the PIP is mechanically processed, reduced in size, and pulped to create a PIP containing stock. In block 130, the PIP containing stock is run through a paper machine and paper is made from it. In block 140, a paper product is made from the paper. In block 150, the paper product is used in the same industry in which the PIP was used.

Figure 2:
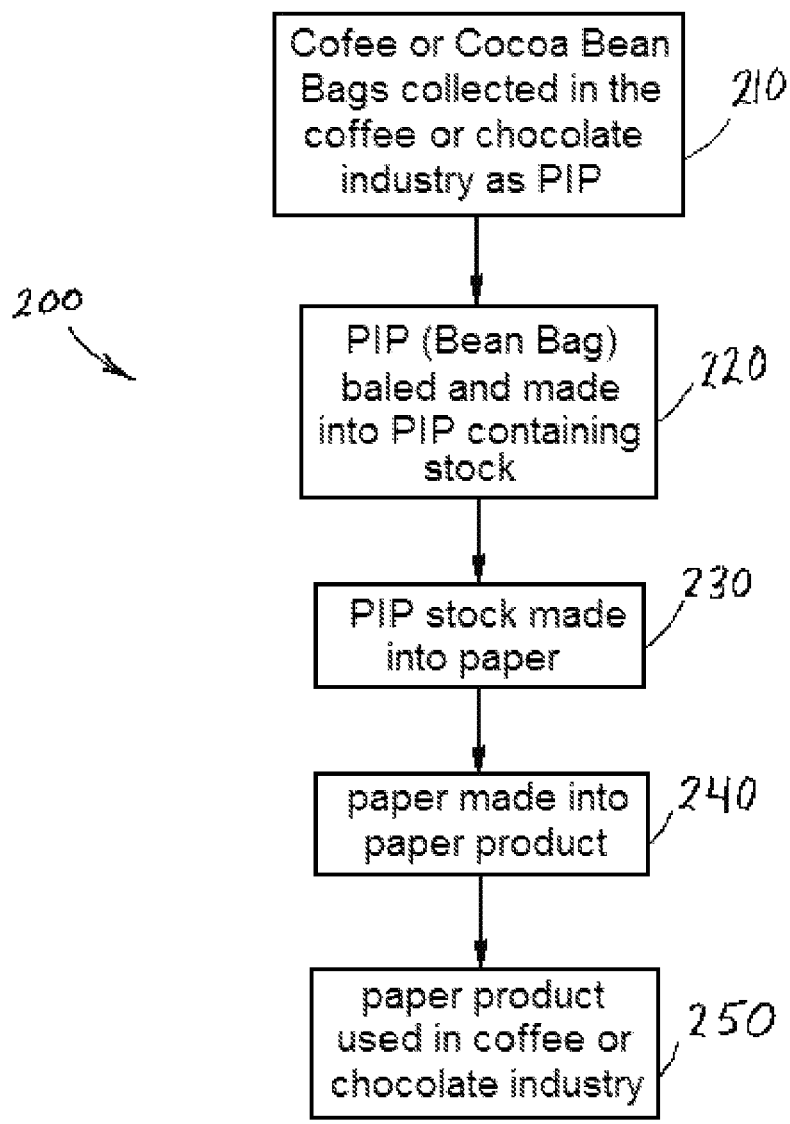
FIG. 2 is a flowchart illustrating the method of recycling post-industrial packaging material being performed in a coffee or chocolate industry.

FIG. 2 shows, in flowchart format, a more specific variant of the method 100 of FIG. 1. Method 200 is directed to PIP recycling in a coffee related or chocolate related industry. In block 210, used coffee and/or cocoa bean bags are collected as PIP. The coffee and/or cocoa bean bags are of a burlap-type and are made from at least one of sisal and jute. The coffee and/or cocoa bean bags were for transporting bulk quantities of coffee and/or cocoa beans, for example, from a distributor to a retailer, roaster, or further processor.

Still referring to FIG. 2, in block 220, the coffee and/or cocoa bean bags are processed and then packaged as bales in a manner that is described in greater detail elsewhere herein. The bales are loaded into a pulper and pulped to create a PIP containing stock. In block 230, the PIP containing stock is run through a paper machine and paper is made from it.

Still referring to FIG. 2, in block 240, a paper product that is usable in the coffee and/or chocolate industry is made from the paper. The paper product may be at least one of (i) point-of-sale products, (ii) counter cards, (iii) signage, (iv) card carriers, (v) product tags, (vi) retail products, and (vii) retail packaging. Examples of suitable point-of-sale products include but are not limited to placemats, table runners, shrouds for table top cubes, frames mounted to kraft corrugate to house 4-color printed graphics, shelf liners, frame corner decorations, lug-ons for menus or other signage, and tabletop accordion fold frames. Examples of product tags include but are not limited to hang tags, band wraps, belly bands, and gift tags. Examples of retail products include but are not limited to notepads, recipe cards, stationary products, apparel, calendars, coasters, and greeting cards. Examples of retail packaging include but are not limited to coffee or other cup sleeves, handbags, and gift boxes. Regardless of the particular configuration or type of paper product made from the coffee and/or cocoa bean bags, in block 250, such paper product is sent to a coffee retailer or roaster, or chocolate retailer or processor for, e.g., retail or point of sale use.

Figure 3:
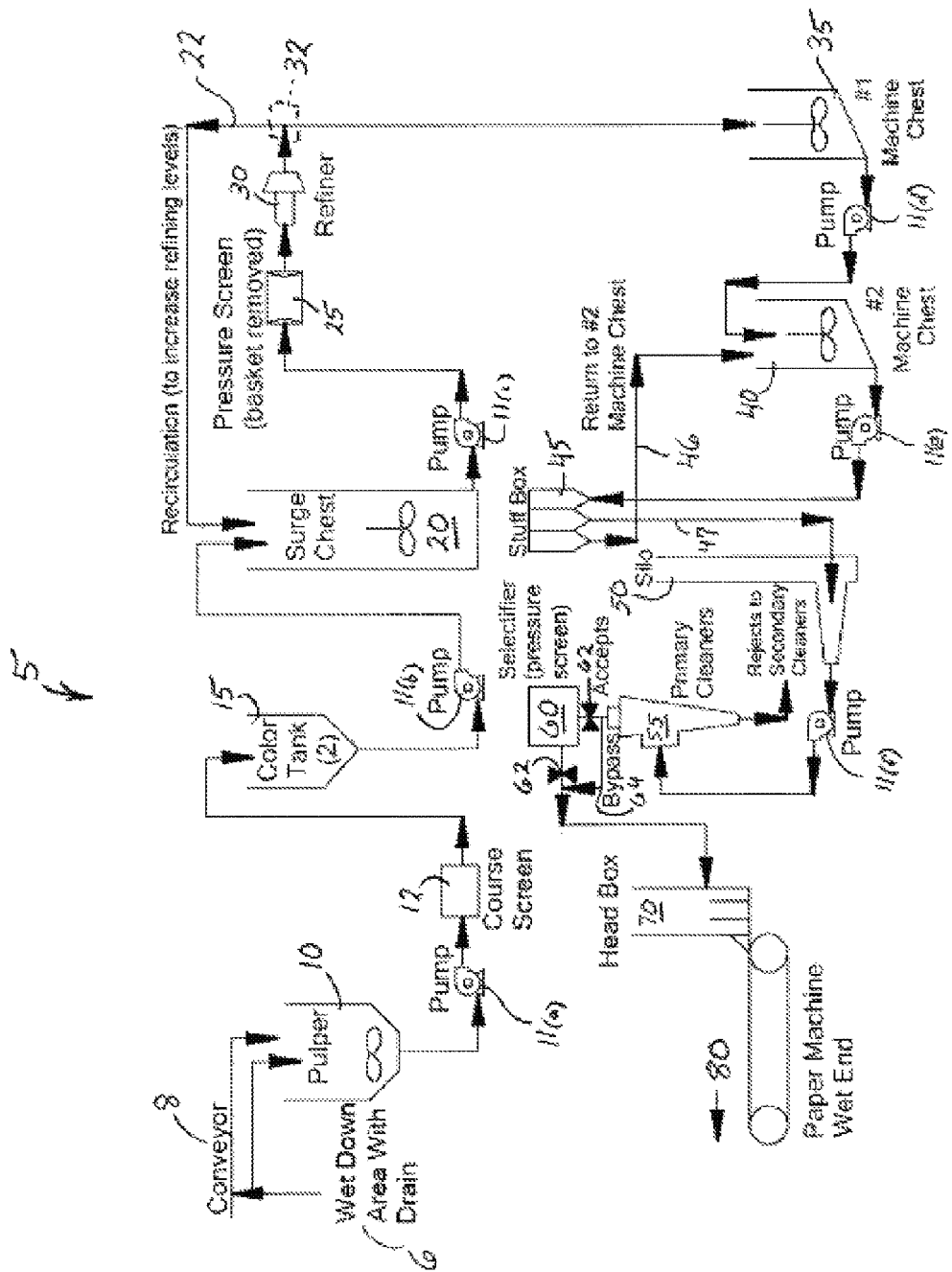
FIG. 3 is a schematic flow diagram of a non-integrated paper mill operating according to methods of and producing products of the present invention.
Figure 2:
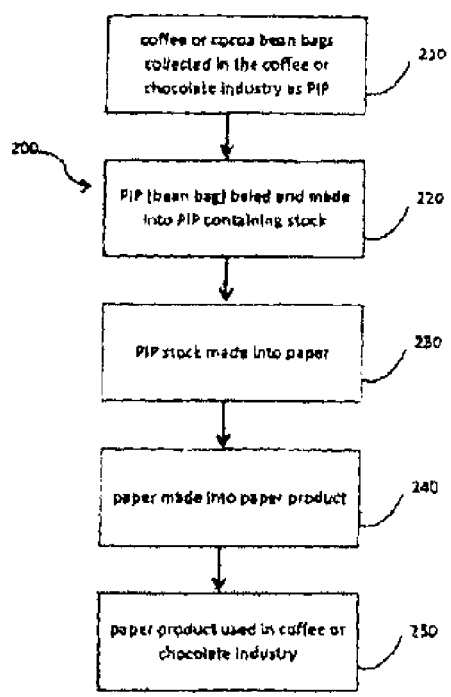

Referring now to FIG. 3, this schematic representation shows process flow through a non-integrated paper mill 5; in other words, a mill 5 without raw wood pulping capabilities, although in another embodiment, the methods are performed in an integrated paper mill (not shown). As will be described in greater detail below, mill 5 in this embodiment is configured to, e.g., allow for (i) pre-wetting of bales of material to be pulped, (ii) recirculated material between a surge chest and a refiner to increase refining time and thus increase a level of refining of a material before a run begins, (iii) direct material through a pressure screen with its basket removed ahead of the refiner, and (iv) bypass a Selectifier to deliver material out of a fan pump, through primary cleaners, around but not through the Selectifier, and to a head box at a wet end of a paper machine.

Still referring to FIG. 3 and initially describing the general layout of the mill 5, the mill 5 includes a wet-down area 6 and a conveyor 8 that carries material, e.g., a bale, to a pulper 10. Pump 11(a) conveys material through pipes that connect the pulper 10, a course screen 12, and empty into one or more color tank(s) 15. Pump 11(b) conveys material through pipes extending from the color tank(s) 15 to a surge chest 20.

Still referring to FIG. 3, pump 11(c) conveys material through pipes that connect the surge chest 20, a pressure screen 25, a refiner 30, and empty into a first machine chest 35. In a preferred embodiment, the pressure screen 25 has been modified by removing its basket. In this embodiment, a valve 32 is provided between the refiner 30 and the machine chest 35. When the valve 32 is in a first flow-through position, it directs material flowing out of the refiner 30 to the machine chest 35. When the valve 32 is in a second recirculating position, it diverts the material flowing out of the refiner 30 away from the machine chest and instead directs the material through pipes that extend to and empty into the surge chest 20. In this way, a recirculation loop 22 is defined between the surge chest 20, basket-removed pressure screen 25, refiner 30 and then back to the surge chest 20. Correspondingly, when the valve 32 is in its second recirculating position, pump 11c continuously recirculates material through the recirculation loop 22. Doing so increases a refining level of the material by repetitively passing the material through the surge chest, basket-removed pressure screen 25, and refiner 30, in series.

Still referring to FIG. 3, material from the first machine chest 35 is delivered by pump 11(d) through pipes that extend between the first machine chest 35 to a second machine chest 40, emptying into the second machine chest 40. Pump 11(e) delivers material through pipes that connect the second machine chest 40 to a stuff box 45. Return pipes 46 connect the stuff box 45 back to the second machine chest 40 and box outlet pipes 47 connect the stuff box to a fan pump 11(f). Pump 11(f), which is configured as a fan pump, delivers material from the silo 50 through pipes that extend between the silo 50 and primary cleaners 55. From the primary cleaners 55, rejects are sent to secondary cleaners 57. Accepts from the primary cleaners 55 are sent toward, but bypassed around, a Selectifier 60 pressure screen, whereby the accepts are sent from the primary cleaners 55 directly to a head box 70 at a wet end of a paper machine 80.

Referring yet further to FIG. 3, in this embodiment, valves 62 are provided on opposing sides of the Selectifier 60 so that when the valves 62 are closed, access to the pressure screen of the Selectifier 60 is completely prohibited. A spool piece of pipe 64 extends between and connects the primary cleaners 55 and the head box 70, bypassing the Selectifier 60 and its pressure screen when the valves 62 are closed.

As is known in the art, the various components of the mill 5 are interconnected with and controlled by an industrial controller system (not shown). The industrial controller system includes an industrial computer or, e.g., a programmable logic controller (PLC), along with corresponding software and suitable hardware that allow a user to input operating parameters for controlling the components of the mill 5 in order to achieve the desired methods and procedures for making paper using PIP and described elsewhere herein.

One exemplary method of making paper from used coffee bean bags as PIP, e.g., those made from sisal and/or jute, in mill 5 is as follows. Used coffee and/or cocoa bean bags are processed offsite and formed into a bale of PIP. The bale is wrapped or faced with a pulp sheet. The pulp sheet is made with at least one of (i) a softwood fiber which may be a virgin fiber, and (ii) a post consumer fiber. The bale is delivered to the mill 5 and wetted down thoroughly with water in the wet-down area 6. The bale may be wetted multiple times, with periodic soaking times between the applications of water during the wetting. The bale is carried by conveyor 8 to the pulper 10 while still being fully bound, e.g., by wires, and having its facing pulp sheet intact. The wires are released during the loading process, prior to leaving the conveyor or while the bale is being suspended above the pulper 10. The pulp sheet that faces the bale is loaded into the pulper and pulped with the bale so that the pulp sheet is incorporated into the stock from which the paper is made.

During various trials, different forms of paper have been produced from stock that was made from PIP. The paper made from PIP from the trials has performed acceptably while making end-use paper products, such as paper bags. Paper made from PIP according has exhibited the characteristics and qualities shown in Tables 1-3. More specific examples of suitable procedures for making paper from PIP are described below.

TABLE 1

PIP PAPER TEST SPECIFICATIONS

| | 65# TAG | | | 60# TAG | | |
|---|---|---|---|---|---|---|
| PARAMETER | TARGET | TOLERENCE | RESULTS | TARGET | TOLERENCE | RESULTS |
| BASIS WEIGHT (24 × 36 – 500) | 65 | | 68 | 60 | | 62.30 |
| CALIPER | | TEST | 8.0 | 5.6-7.1 | | 7.8 |
| pH (COLD EXTRACT) | 8.1 | 7.6-8.6 | 8.1 | 8.1 | 7.6-8.6 | 8.0 |
| TENSILE (MD/CD) | | TEST | 20/13 | | TEST | 22.5/16 |
| TEAR (MD/CD) | | TEST | 120/136 | | TEST | 128/148 |
| HST (SEC.) | 200 | 150 min. | 285 | 200 | 150 min | 200+ |
| GURLEY POROSITY (SEC.) | 40 | 20 min. | 10 | 40 | 20 min | 12 |
| MOISTURE (%) | | TEST | 5.3% | | TEST | 5.6% |
| SMOOTHNESS (SHEFFIELD) | 280 | TEST | 400/380 | 280 | TEST | 390/380 |
| WAX PICK | 13 | TEST | 16+ | 13 | TEST | 14 |

TABLE 2

PIP PAPER - 60# LINER TEST SHEET SPECIFICATIONS

| PARAMETER | TARGET | TOLERENCE | SET 1 |
|---|---|---|---|
| BASIS WEIGHT (24 × 38-500) | 60.00 | 57.00-63.00 | 61.62 |
| CALIPER | 5.6-7.1 | Test | 8.8 |
| pH (COLD EXTRACT) | 8.1 | 7.6-8.6 | 8.0 |
| TENSILE (MD/CD) | 37/16 | TEST | 22.5/16 |
| TEAR (MD/CD) | 106/118 | TEST | 128/148 |
| HST (SEC.) | 200 | 150 min. | 200+ |
| POROSITY (SEC.) | 20 | TEST | 2 |
| MOISTURE (%) | 5.50% | 4.5%-6.5% | 5.8 |
| SMOOTHNESS (SHEFFIELD) | 280 | TEST | 500+/500+ |
| WAX PICK | 13 | TEST | 16+ |
| FOLD (MIT Double Folds- MD/CD) | TEST | 185/90 | |

TABLE 3

PIP PAPER - 80# COVER TEST SHEET SPECIFICATIONS

| PARAMETER | TARGET | TOLERENCE | SET 1 |
|---|---|---|---|
| BASIS WEIGHT (20 × 26-500) | 80.00 | 76.00-84.00 | 80.62 |
| CALIPER | 13.5 | TEST | 15.0 |
| pH (COLD EXTRACT) | 8.1 | 7.6-8.6 | 8.1 |
| TEAR (MD/CD) | 80/95 | TEST | 200/216 |
| HST (SEC.) | 200 | 150 min. | 200+ |
| POROSITY (SEC.) | 20 | TEST | 6 |
| MOISTURE (%) | 5.00% | 4.5%-5.5% | 7 |
| SMOOTHNESS (SHEFFIELD) | 360 | TEST | 400 |
| WAX PICK | 13 | TEST | 13+ |
| COLOR (DE) | <0.5 | 1.0 max | n/a |

Example 1

In this example, and still referring to FIG. 3, paper is made from PIP that is incorporated into a mixed fiber stock. The mixed fiber stock includes the components shown in Table 4. A volume of PIP containing stock, referred to as Big Beater stock, is made from three 1000-pound bales of processed used coffee bean bags as (sisal and jute) PIP. The bales are wetted at wet-down area 6 and loaded into pulper 10. The other major Big Beater stock constituents, in this example, 500 pounds of post consumer wet lap pulp as PCF and 100 pounds of HO-97 calcium carbonate, are added to the pulper 10, and the pulper 10 is operated to form the Big Stock. The Big Beater stock is pumped by pump 11(*a*) through the course screen 12 and into color tank 15. The Big Beater stock is then pumped into surge chest 20.

A volume of PCF stock, referred to as a first Small Beater stock, is prepared. The Small Beater stock constituents include 250 pounds of post consumer wet lap pulp and 750 pounds of broke as PCF that are combined in the pulper 10. Pulper 10 processes the Small Beater stock and the Small Beater stock is pumped by pump 11(*a*) through the course screen 12 and into color tank 15 that previously held the Big Beater stock. With the first Small Beater stock in the color tank 15, a second Small Beater stock is prepared in the same way and pumped into the same color tank 15.

During preparation of the Small Beater stocks, refiner 30 is operated at a setting of 250 amps and the Big Beater stock is recirculated through the recirculation loop 22 and thus through the surge chest 20, pressure screen 25 with its basket removed, and refiner 30. The recirculation is performed for about 60 minutes, e.g., between about 45 to 90 minutes. After the Big Beater stock has recirculated through the recirculation loop 22 for 60 minutes, the pump 11*b* pumps the two loads of Small Beater stock into the surge chest 20. The Big and Small Beater stock is mixed well to make the mixed fiber stock before pumping the mixed fiber stock into the machine chests 35, 40.

In one embodiment of the method, the machine chests 35, 40 are filled about half-full with the mixed fiber stock. Some of the mixed fiber stock is pumped to the stuff box 45 and silo 50. Such mixed fiber stock is then pumped through the primary cleaners 55 and the "accepts" that are separated from "rejects" are bypassed around the Selectifier 60 to the head box 70 at the wet end of paper machine 80. Some paper is run on the paper machine 80 and evaluated to confirm whether the paper is acceptable or if further refining of the mixed fiber stock is required.

Preferably, the head box 70 is set up with minimum turbulence in its back chambers and delivered with a very low head. The paper may be run to, e.g., an 80-pound cover (20×26-500 basis) with the desired finish. Also referring to the process generally, fresh water is not required for making the Big and Small Beaters and the mill's standard PVA/Starch Mix can be used and may be run out of the same tank as the previous grade, if available.

TABLE 4

50% COFFEE BEAN BAG FIBER
50% POST CONSUMER WASTE COVER (SBK)

| Big Beater Stock (3500#) | Small Beater Stock (1000#) |
|---|---|
| 500 # Post Consumer Wet Lap Pulp (1/2 Stack) | 250 # Post Consumer Wet Lap Pulp (1/4 Stack) |
| 3000 # Coffee Bean Bag Fiber (Sisal and Jute Fiber) | 750 # PCW Broke |
| 100 # HO-97 Calcium Carbonate | |

Example 2

In this example, paper is made from PIP that is incorporated into a mixed fiber stock. The procedure is the same as that listed above with respect to EXAMPLE 1. However, in this example, the Big Beater stock is 4000 pounds and made using 3000 pounds of processed coffee bean bags as PIP (sisal and jute), 1000 pounds of post consumer wet lap, and 150 pounds of HO-97 calcium carbonate. The mixed fiber stock of this example includes the components shown in Table 5.

TABLE 5

50% COFFEE BEAN BAG FIBER
50% POST CONSUMER WASTE COVER (SBK)

| Big Stock (4000#) | Small Stock (1000#) |
|---|---|
| 1000 # Post Consumer Wet Lap Pulp | 1000 # Post Consumer Wet Lap Pulp (1 Stack) |
| 3000 # Coffee Bean Bag Fiber (Sisal and Jute Fiber) | |
| 150 # HO-97 Calcium Carbonate | |

Example 3

A variety of paper has been successfully made using the methods and mixed fiber stock as described in EXAMPLES 1 and 2, above. For example, during an initial run, a 28.14# Bond sheet (65# Tag on a 3000 sq. ft basis) was produced, making a roughly 72-inch deckle for 500#. Then a 25.97# sheet (60# Tag/Liner) was produced, making two 26.25-inch rolls followed by a 73-inch deckle (about 500# each). The remaining mixed fiber stock was used to make a 57.55# Bond sheet (80# Cover on a 20×26-500 or 1806 sq. ft. basis) and a 46.75# Bond sheet (65# Cover).

Various starch and sizing considerations have been identified and addressed. During trials running four different basis weights, porosity levels were evaluated. In some embodiments, sodium alginate has been used to increase the porosity of the paper. Making paper that is suitable for paper bag production has been achieved in the following method which ensures about 8% solids to be able to pump the starch to a size press. A typical batch of starch is cooked up with PWA and it is diluted to 10% in a large holding tank. A paper-making trial is set up and run on the mill 5 until various specifications like weight, moisture, and HST have been achieved. Once production is ready, the starch is switched over to an 8% Starch/PVA/Sodium Alginate mix from a small holding tank. After this initial weight run is completed, the mill 5 is switched to a slightly lighter tag weight and about 500 pounds of paper is made with the sodium alginate in the starch before being switch back to the regular 10% Starch/PVA mix for the remainder of the trial.

Such starch adjusting may be done as follows. Regarding the 8% Starch/PVA/Sodium Alginate Mix: about 18 inches of 12% starch are pumped from a cooker to the small holding tank (the middle tank) before the rest of the batch is pumped to the large holding tank. The starch in the small holding tank is diluted down to 8% using steam and the agitator to mix and heat the water and starch to 105 degrees. This temperature is maintained between about 103 and about 110. Around the time that paper is being brought across the paper machine 80, sodium alginate, using an eductor, is added according to the following formula: 0.8 pounds of sodium alginate per inch of 8% starch. In other words, if the starch level was at 20 inches, 16 pounds of sodium alginate would be added. Theoretically, if the small tank is filled to 18 inches with 12% starch, then about 27 inches of 8% starch would be provided which requires about 21.6 pounds (call it 21½ pounds) of sodium alginate. This amount of sodium alginate is educted into the starch with agitation and mixed for 15 minutes (minimum).

Example 4

Controlling paper coloring has been done in a variety of ways while making paper from the PIP. During some runs in which paper was made from used coffee bean bags as PIP, such as those described in EXAMPLES 1-3, paper color was controlled by controlling relative amounts of sisal and jute within the Big Beater batch.

Accordingly, according to some methods of the invention, different colors, feel, and strength of the paper are made by adjusting the relative amounts of sisal versus other components of a stock that is run through the paper machine 80, e.g., jute or other components of the stock. Preferably, the number of sisal coffee bean bags and the number of jute coffee bean bags that are processed and bailed into each bale is selected to provide the desired relative amounts of sisal and jute fibers that will be used in the stock, or sisal and jute bags are processed separately into bales so the bales can be added in the desired proportions. The result is that stock having relatively more sisal fiber produces paper with relatively more white or lightly colored flecks, which provides a relatively lighter color appearance to the paper itself. Trials have shown that providing a sufficient amount of sisal produces a paper that is much lighter without requiring any dying or bleaching.

Trials have also shown that the paper made from PIP can be acceptably colored using dyes. For example, two trials were run that produced colored paper. Trial 1 established a natural color that made the paper appear relatively more homogeneous, when compared to uncolored paper, without being substantially darker. Trial 2 established a "Christmas Green" type color. The particular formulas used and established during Trial 1 and Trial 2 are shown in Table 6 and Table 7, respectively.

During the dye coloring trials, dye pumps were used for all dyes and the paper was run on a mill 5. The color was dropped first without any dye. During Trial 2, all of the dyes were added to the fan pump 11(*f*), except the cationic dye, which is added to the Stuff Box 45. The dye pumps were used to even out the sides. Both direct and cationic dyes were used to create the "Christmas Green" type color.

TABLE 6

50% COFFEE BEAN BAG FIBER
50% POST CONSUMER WASTE COVER (SBK)
DYE COLORING TRIAL 1

TRIAL 1
Expected Formula (5000#)

C 1 # Pontamine Bond Blue B liq.
C 24 oz Pontamine Fast Red 8BLX liq.
C 4 # Pontamine Golden Yellow RB liq.

TABLE 7

50% COFFEE BEAN BAG FIBER
50% POST CONSUMER WASTE COVER (SBK)
DYE COLORING TRIAL 2

TRIAL 2
Expected Formula (5000#)

230 # Levacell Blue 6GLL liq.
C 38 # Pontamine Bond Blue B liq.
5 # Pontamine Fast Scarlet 4B liq.
C 1 # Pontamine Fast Red 8BLX liq.
388 # Pontamine Brilliant Yellow 5GA liq.
C 2 # Pontamine Golden Yellow RB liq.

Various other embodiments of the present invention are contemplated as being within the scope of the filed claims particularly pointing out and distinctly claiming the subject matter regarded as the invention.

The invention claimed is:

1. A method of producing paper from post-industrial packaging material comprising the steps of:
    pulping a first material that includes post-industrial packaging (PIP) to make a volume of PIP containing stock;
    recirculating the PIP containing stock through a recirculation loop defined at least in part between a surge chest and a refiner during a first time period;
    pulping a second material that includes at least one of (i) post consumer fiber (PCF) to make a volume of PCF stock, and (ii) non-PCF wood based fiber (WBF) to make a volume of WBF stock;
    combining the volumes of PIP containing stock and the at least one of PCF stock and WBF stock to make a volume of mixed fiber stock during a second time period; and
    running the mixed fiber stock through a paper machine to produce paper having a wax pick value of about 13 or greater.

2. The method of claim 1, wherein the PIP containing stock includes at least one of (i) sisal fibers and (ii) jute fibers that define at least about 50% of a total fiber mass of the mixed fiber stock.

3. The method of claim 2, wherein at least one of used coffee bean bags and used cocoa bean bags provide the sisal and jute fibers of the PIP containing stock.

4. The method of claim 1, wherein the PIP containing stock further comprises a volume of at least one of PCF and WBF and wherein the at least one of PCF and WBF defines no more than about 25% of a total fiber mass of the PIP containing stock.

5. The method of claim 1, wherein, within the mixed fiber stock, the volume of PIP containing stock is less than the volume of the at least one of PCF stock and WBF stock.

6. A method of producing paper from post-industrial packaging material comprising the steps of:
    pulping a first material that includes post-industrial packaging (PIP) having at least one of sisal fibers and jute fibers to make a volume of PIP containing stock;
    recirculating the PIP containing stock between a surge chest and a refiner during a first time period;
    pulping a second material that includes at least one of (i) post consumer fiber (PCF) to make a volume of PCF stock, and (ii) non-PCF wood-based fiber (WBF) to make a volume of WBF stock;
    combining the volumes of PIP containing stock and the at least one of PCF stock and WBF stock to make a volume of mixed fiber stock during a second time period;
    running the mixed fiber stock through a paper machine to produce paper incorporating at least one of sisal fibers and jute fibers; and
    making a paper product from the paper, wherein the paper product has a basis weight of less than about 65# per (24×36-500) area and has a wax pick value of about 13 or greater.

7. The method of claim 6, wherein the at least one of sisal fibers and jute fibers defines at least about 50% of a total fiber mass of the mixed fiber stock.

8. The method of claim 6, wherein the at least one of sisal fibers and jute fibers defines at least about 75% of a total fiber mass of the PIP containing stock.

9. The method of claim 8, wherein the at least one of sisal fibers and jute fibers defines at least about 85% of a total fiber mass of the PIP containing stock.

10. The method of claim 6, further comprising directing the PIP containing stock through a primary cleaner and to a headbox of the paper machine while bypassing a Selectifier pressure screen that is provided between the primary cleaner and the headbox.

11. The method of claim 6, further comprising removing a basket from a pressure screen and directing the PIP containing stock through the pressure screen with its basket removed while pumping the PIP containing stock from a surge chest to a refiner.

12. The method of claim 6, further comprising controlling a color of the paper by controlling an amount of sisal relative to at least one other component of the material loaded into a pulper.

13. The method of claim 6, wherein the paper has a SHEFFIELD smoothness value of about 400 or less.

14. The method of claim 6, wherein the paper has a GURLEY porosity value of about 10 seconds or greater.

15. The method of claim 6, wherein the paper has an HST value of about 200 seconds or greater.

16. A method of producing paper from post-industrial packaging material comprising the steps of:

pulping a first material that includes post-industrial packaging (PIP) having at least one of sisal fibers and jute fibers to make a volume of PIP containing stock;

pulping a second material that includes at least one of (i) post consumer fiber (PCF) to make a volume of PCF stock, and (ii) non-PCF wood-based fiber (WBF) to make a volume of WBF stock;

combining the volumes of PIP containing stock and the at least one of the PCF stock and the WBF stock to make a volume of mixed fiber stock wherein the at least one of the sisal and jute fibers defines at least about 50% of a total fiber mass of the mixed fiber stock; and running the mixed fiber stock through a paper machine to produce paper having a basis weight of less than about 65# per (24×36-500) area.

17. The method of claim 16, wherein the paper has a wax pick value of about 13 or greater and a SHEFFIELD smoothness value of about 400 or less.

18. The method of claim 17, wherein the paper has a GURLEY porosity value of about 10 seconds or greater and an HST value of about 200 seconds or greater.

* * * * *

UNITED STATES PATENT AND TRADEMARK OFFICE
CERTIFICATE OF CORRECTION

| | | |
|---|---|---|
| PATENT NO. | : 8,784,610 B1 | Page 1 of 2 |
| APPLICATION NO. | : 13/337861 | |
| DATED | : July 22, 2014 | |
| INVENTOR(S) | : Thomas A. Danz | |

It is certified that error appears in the above-identified patent and that said Letters Patent is hereby corrected as shown below:

On the title page, item (57), in the abstract, on line 11, please delete the "a" following "fiber stock that is" and before "combined with."

In the Drawings

Replace Fig. 2 with the corrected version included on the attached sheet. Only the text of the upper-most box changed. Whereas it formerly read "Cofee or Cocoa Bean Bags," the corrected text reads "coffee or cocoa bean bags."

In the Specification

Column 2, line 5, please insert --as-- following "such."

Column 3, line 64, please replace "as" with "and." (First Occurrence)

Column 7, line 10, please delete "according."

Column 7, line 17, Table 1, please replace both instances of the column title "tolerence" with "tolerance."

Column 7, line 43, Table 2, please replace the column title "tolerence" with "tolerance."

Column 7, line 64, and Column 8, line 5 and 43, Table 3, please replace all three instances of the column title "tolerence" with "tolerance."

Signed and Sealed this
Sixteenth Day of December, 2014

Michelle K. Lee
*Deputy Director of the United States Patent and Trademark Office*